United States Patent
Preston et al.

(10) Patent No.: US 12,133,616 B2
(45) Date of Patent: Nov. 5, 2024

(54) PORTABLE KITCHEN ASSEMBLY

(71) Applicants: Demetrius Preston, Montgomery, AL (US); Michael Preston, Montgomery, AL (US)

(72) Inventors: Demetrius Preston, Montgomery, AL (US); Michael Preston, Montgomery, AL (US)

( * ) Notice: Subject to any disclaimer, the term of this patent is extended or adjusted under 35 U.S.C. 154(b) by 439 days.

(21) Appl. No.: 17/540,397

(22) Filed: Dec. 2, 2021

(65) Prior Publication Data

US 2023/0172399 A1   Jun. 8, 2023

(51) Int. Cl.
| | |
|---|---|
| *F24C 7/08* | (2006.01) |
| *A47J 36/32* | (2006.01) |
| *A47J 37/12* | (2006.01) |
| *A47J 44/00* | (2006.01) |
| *B62B 1/10* | (2006.01) |
| *B62B 5/06* | (2006.01) |
| *H04R 1/02* | (2006.01) |
| *H04R 3/00* | (2006.01) |
| *F25D 11/00* | (2006.01) |
| *H02J 7/00* | (2006.01) |

(52) U.S. Cl.
CPC ............... *A47J 44/00* (2013.01); *A47J 36/32* (2013.01); *A47J 37/1204* (2013.01); *A47J 37/129* (2013.01); *B62B 1/10* (2013.01); *B62B 5/06* (2013.01); *F24C 7/082* (2013.01); *H04R 1/028* (2013.01); *H04R 3/00* (2013.01); *A47J 2201/00* (2013.01); *F25D 11/003* (2013.01); *H02J 7/0063* (2013.01); *H02J 2207/20* (2020.01)

(58) Field of Classification Search
CPC .......... F25D 23/12; F25D 11/003; F24C 7/10; F24B 1/207; B62B 1/125
USPC ............................................. 126/276, 275 E
See application file for complete search history.

(56) References Cited

U.S. PATENT DOCUMENTS

| | | | | |
|---|---|---|---|---|
| 2,798,930 | A * | 7/1957 | Frost ..................... | F24C 15/102 219/403 |
| 4,757,755 | A * | 7/1988 | Sarten ..................... | A47J 37/06 D7/334 |
| 5,683,157 | A | 11/1997 | Peterson | |
| D425,328 | S | 5/2000 | Welling | |
| 6,079,400 | A | 6/2000 | Tomat Dany | |
| 6,543,436 | B2 | 4/2003 | Montgomery | |
| 8,696,075 | B1 * | 4/2014 | Rios ........................ | A47F 10/06 312/249.12 |

(Continued)

FOREIGN PATENT DOCUMENTS

WO   WO 1997022836   6/1997

*Primary Examiner* — Ko-Wei Lin

(57) ABSTRACT

A portable kitchen assembly for cold storage and cooking of food items includes a housing, which defines an interior space. A power module is engaged to the housing. A cooktop is engaged to an upper facet of the housing and is operationally engaged to the power module. An oven is engaged to the housing and is positioned in the interior space so that a door of the oven is accessible from a front of the housing. Food items can be heated on the cooktop or baked or cooked in the oven. A cooling unit is engaged to the housing and is positioned in the interior space so that a door of the cooling unit is accessible from the front of the housing. The cooling unit provides cold storage for a food item. A set of wheels is engaged to a lower facet of the housing allows for locomotion of the housing across a surface.

17 Claims, 6 Drawing Sheets

(56) References Cited

U.S. PATENT DOCUMENTS

| | | | |
|---|---|---|---|
| 9,015,895 B2 | 4/2015 | Filho | |
| 2004/0112361 A1* | 6/2004 | Zelek | A47J 37/0704 |
| | | | 126/41 R |
| 2007/0029746 A1 | 2/2007 | Brennan, Jr. | |
| 2007/0131221 A1* | 6/2007 | Lightbourne | F24C 11/00 |
| | | | 126/275 R |
| 2015/0166088 A1* | 6/2015 | Khodor | B62B 5/067 |
| | | | 280/639 |
| 2017/0238762 A1* | 8/2017 | Chinnah | F24C 1/16 |
| 2022/0325949 A1* | 10/2022 | Al-Thani | F25D 11/00 |

\* cited by examiner

PORTABLE KITCHEN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to kitchen assemblies and more particularly pertains to a new kitchen assembly for cold storage and cooking of food items. The present invention discloses a kitchen assembly comprising a wheeled housing having an oven and a cooling unit, along with an integral speaker. Each of a plurality of cooktops having a respective cooking purpose is selectively engageable to the housing.

(2) Description of Related Art Including Information Disclosed Under 37 CFR 1.97 and 1.98

The prior art relates to kitchen assemblies. Prior art kitchen assemblies that are designed for portability generally comprise one or more gas fired burners and lack a refrigerator and an oven. What is lacking in the prior art is a kitchen assembly comprising a wheeled housing having an electrically powered oven and an electrically powered cooling unit, along with an integral speaker. Each of a plurality of electrically powered cooktops having a respective cooking purpose is selectively engageable to the housing.

BRIEF SUMMARY OF THE INVENTION

An embodiment of the disclosure meets the needs presented above by generally comprising a housing, which defines an interior space. A power module is engaged to the housing. A cooktop is engaged to an upper facet of the housing and is operationally engaged to the power module. The cooktop is configured to heat a food item. An oven is engaged to the housing and is positioned in the interior space so that a door of the oven is accessible from a front of the housing. The oven is configured to bake or to cook. A cooling unit is engaged to the housing and is positioned in the interior space so that a door of the cooling unit is accessible from the front of the housing. The cooling unit is configured for cold storage of a food item. A set of wheels is engaged to a lower facet of the housing and is configured for locomotion of the housing across a surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
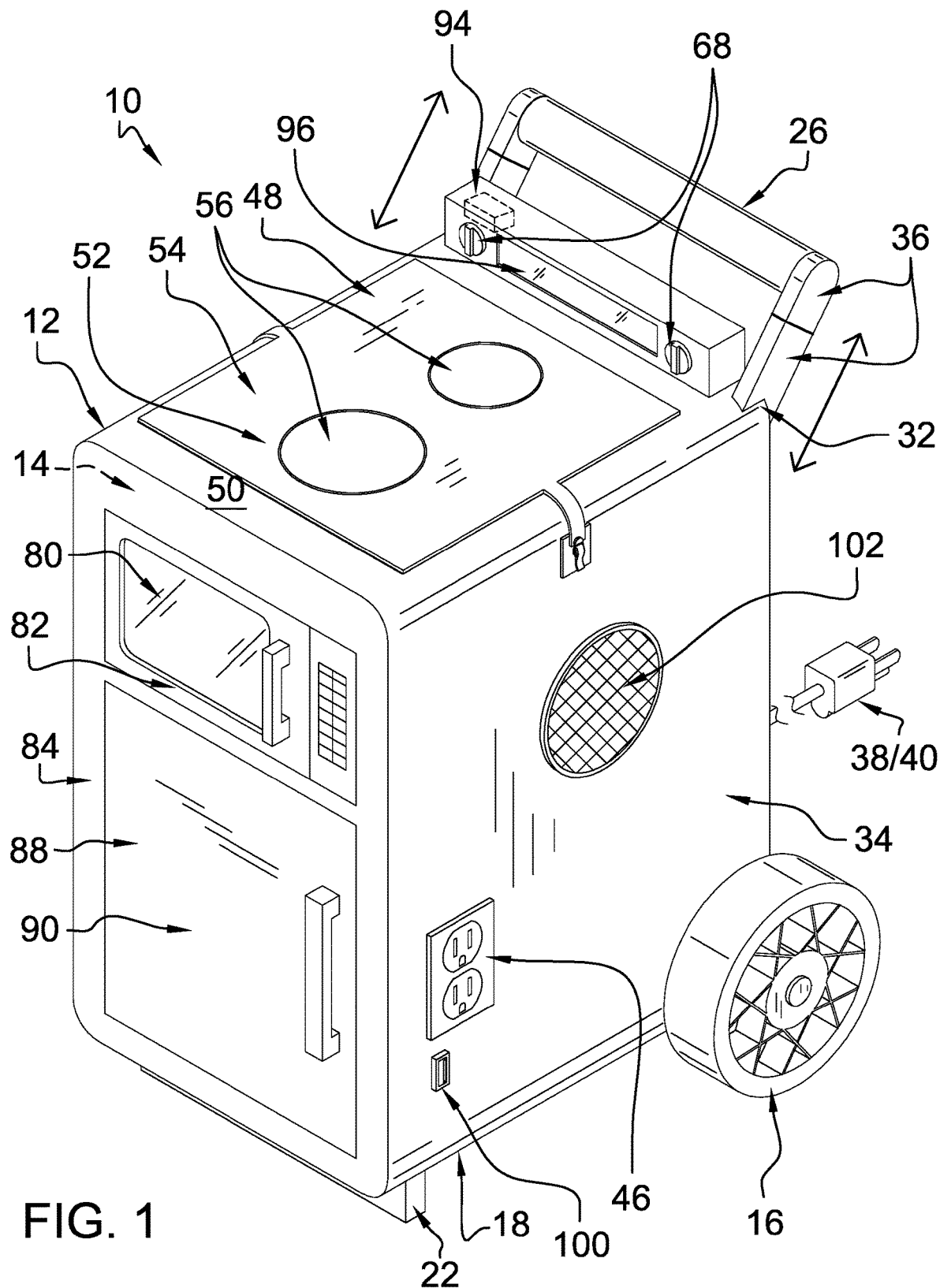
FIG. 1 is an isometric perspective view of a portable kitchen assembly according to an embodiment of the disclosure.

With reference now to the drawings, and in particular to FIGS. 1 through 6 thereof, a new kitchen assembly embodying the principles and concepts of an embodiment of the disclosure and generally designated by the reference numeral 10 will be described.

As best illustrated in FIGS. 1 through 6, the portable kitchen assembly 10 generally comprises a housing 12, which defines an interior space 14. A set of wheels 16 is engaged to a lower facet 18 of the housing 12 and is configured for locomotion of the housing 12 across a surface. The set of wheels 16 may comprise two wheels 16 positioned singly proximate to rear bottom corners 20 of the housing 12. In this configuration, a bar 22, or other spacing element, such as a pair of legs, is engaged to and extends from the lower facet 18. The bar 22 is extends from proximate to front bottom corners 24 of the housing 12 and is configured to abut the surface to position the lower facet 18 substantially parallel to the surface. The present invention anticipates the set of wheels 16 comprising three or more wheels 16, for example, four wheels 16 positioned singly proximate the rear bottom corners 20 and the front bottom corners 24.

A handle 26 is engaged to and extends from the housing 12. The handle 26 is configured to be grasped in a hand of a user, positioning the user to locomote the housing 12. The handle 26 comprises may comprise a pair of side pieces 28 and a center piece 30. Each side piece 28 is engaged to and extends from a respective upper back corner 32 of the housing 12 proximate to a respective opposed side 34 of the housing 12. The center piece 30 is engaged to and extends between the side pieces 28. Each side piece 28 may comprise a plurality of nested sections 36 so that the side piece 28 is selectively extensible. As will be apparent to those skilled in the art of handles, a variety of configurations are possible and are anticipated by the present invention.

A power module 38 is engaged to the housing 12. The power module 38 comprises a power cord 40 and a battery 42, with the battery 42 being rechargeable. The battery 42 may be selectively couplable to the housing 12 so that the battery 42 is selectively detachable from the housing 12 for charging via a charging station (not shown). A power converter 44 is engaged to the housing 12, positioned in the interior space 14, and is operationally engaged to the battery 42 and the power cord 40. The power converter 44 is configured to convert alternating current from the power cord 40 to direct current to charge the battery 42. The power converter 44 also is configured to convert direct current from the battery 42 to alternating current. An outlet 46 is engaged to the housing 12 and is operationally engaged to the power module 38. The outlet 46 is configured for insertion of a power plug of an electrical device to operationally engage the electrical device to the power module 38.

Figure 6:
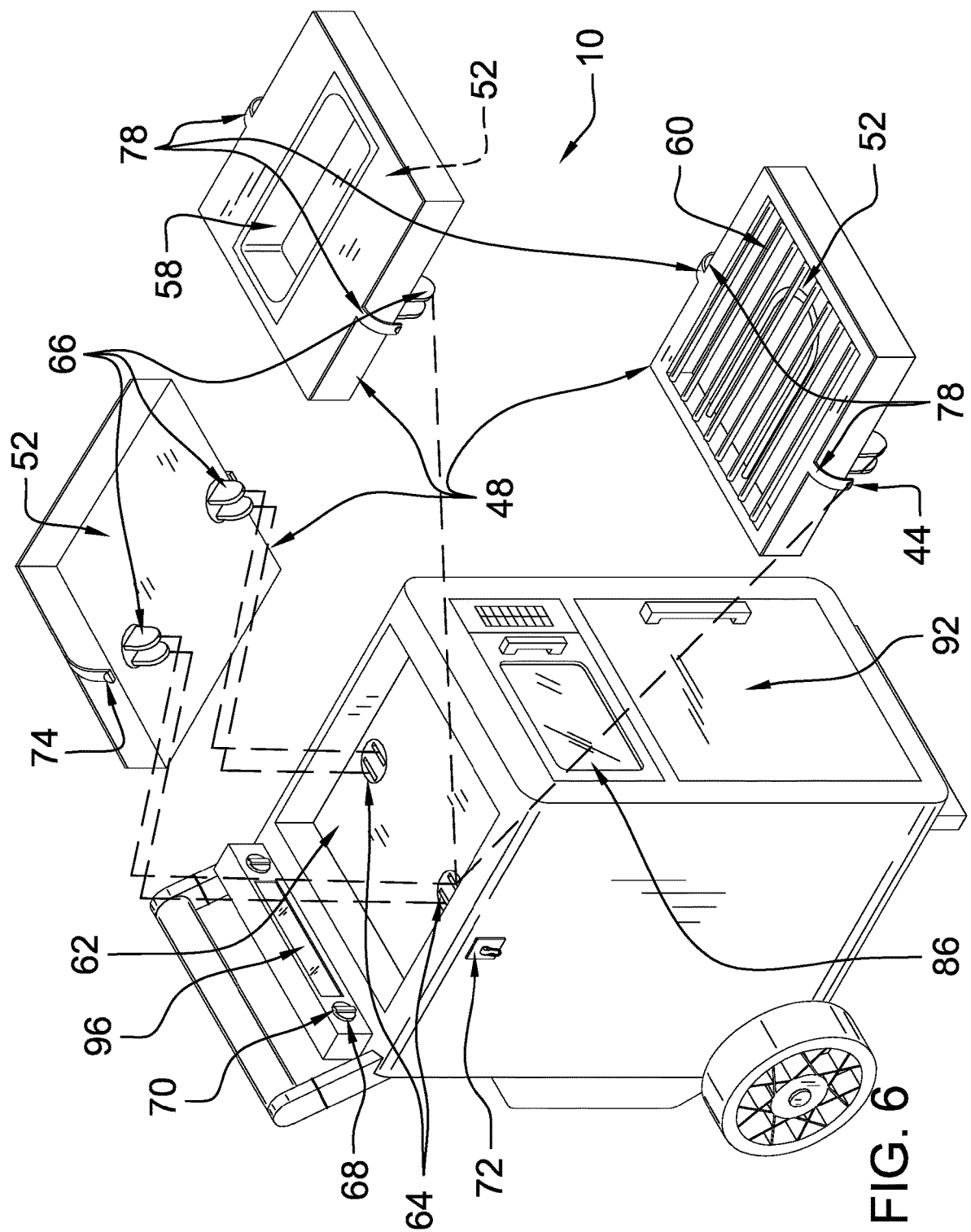
FIG. 6 is an exploded view of an embodiment of the disclosure.

A cooktop 48 is engaged to an upper facet 50 of the housing 12, is operationally engaged to the power module 38, and is configured to heat a food item. The cooktop 48 is one of a plurality of cooktops 48, with each cooktop 48 being selectively engageable to the housing 12 so that the cooktop 48 is operationally engaged to the power module 38. Each of the cooktops 48 comprises a set of heating units 52 and an interface 54, with the set of heating units 52 being operationally engaged to the interface 54. As shown in FIG. 6, the plurality of cooktops 48 comprises cooktops 48 wherein the interface 54 is configured as a set of burners 56, a well 58, and a grill 60, or other type of interface 54, such as, but not limited to, woks, griddles, and the like. Each of the burners 56 is configured to have positioned thereon a respective article of cooking hardware (not shown), such as a pot, a pan, and the like. The set of burners 56 may comprise two burners 56, although the present invention also anticipates the set of burners 56 comprising three or more burners 56. The well 58 is configured to have an oil positioned therein. The set of heating units 52 then is positioned to heat the oil to fry a food item positioned in the oil. The present invention also anticipates a set of handled baskets (not shown) shaped complementarily to the well 58. The grill 60 is configured to grill a food item.

A recess 62 extends into the upper facet 50 of the housing 12. The recess 62 is positioned for at least partial insertion of a respective cooktop 48 of the plurality of cooktops 48. A pair of first connectors 64 is engaged to the housing 12 and is positioned in the recess 62. The first connectors 64 are operationally engaged to the power module 38. A plurality of second connectors 66 is engaged to the plurality of cooktops 48 so that two second connectors 66 are engaged to each cooktop 48. The second connectors 66 are complementary to the first connectors 64. The second connectors 66 that are engaged to a respective cooktop 48 are positioned to selectively engage the first connectors 64 to operationally engage the respective cooktop 48 to the power module 38.

Figure 2:
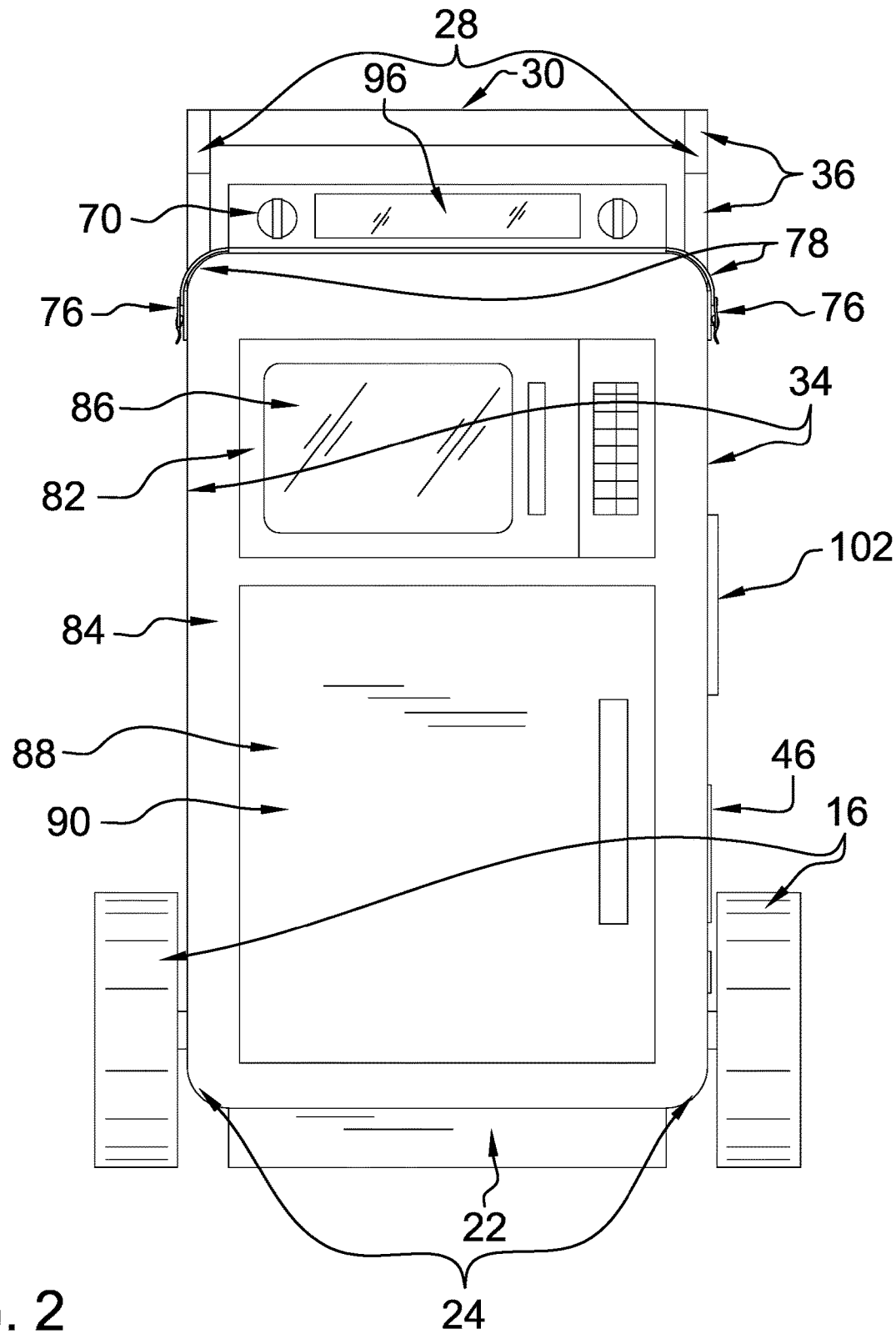
FIG. 2 is a front view of an embodiment of the disclosure.
Figure 3:
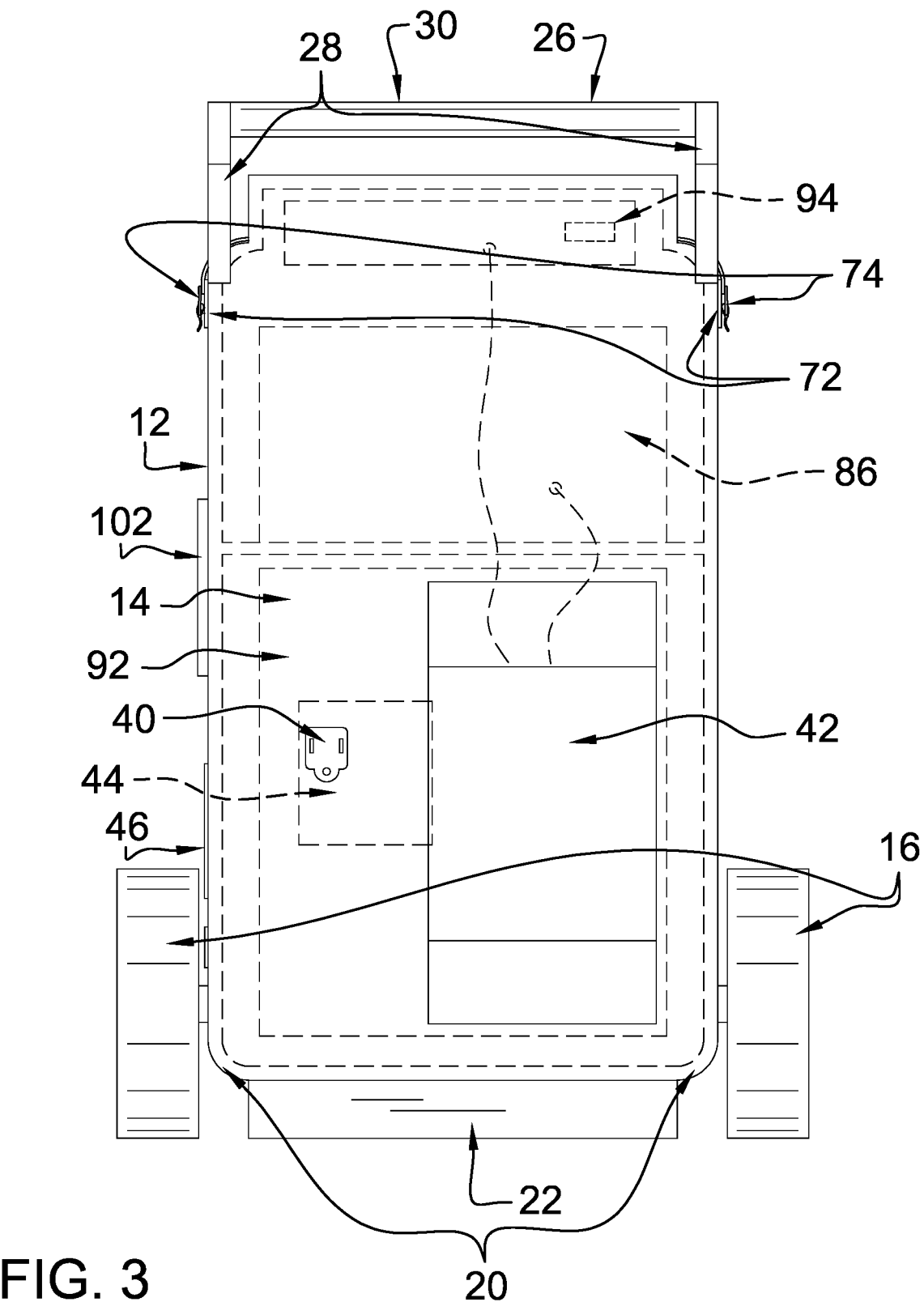
FIG. 3 is a rear view of an embodiment of the disclosure.
Figure 4:
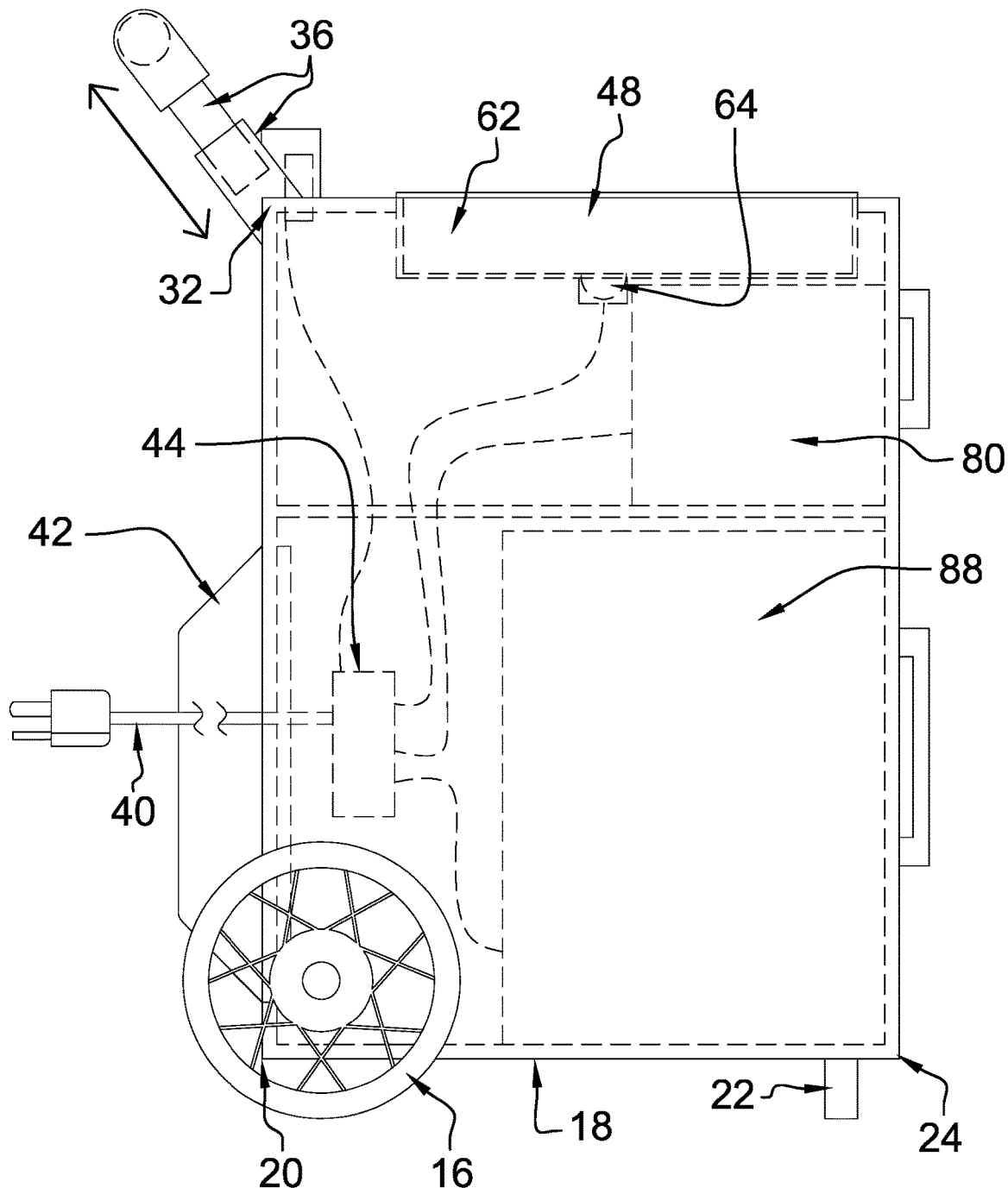
FIG. 4 is a side view of an embodiment of the disclosure.
Figure 5:
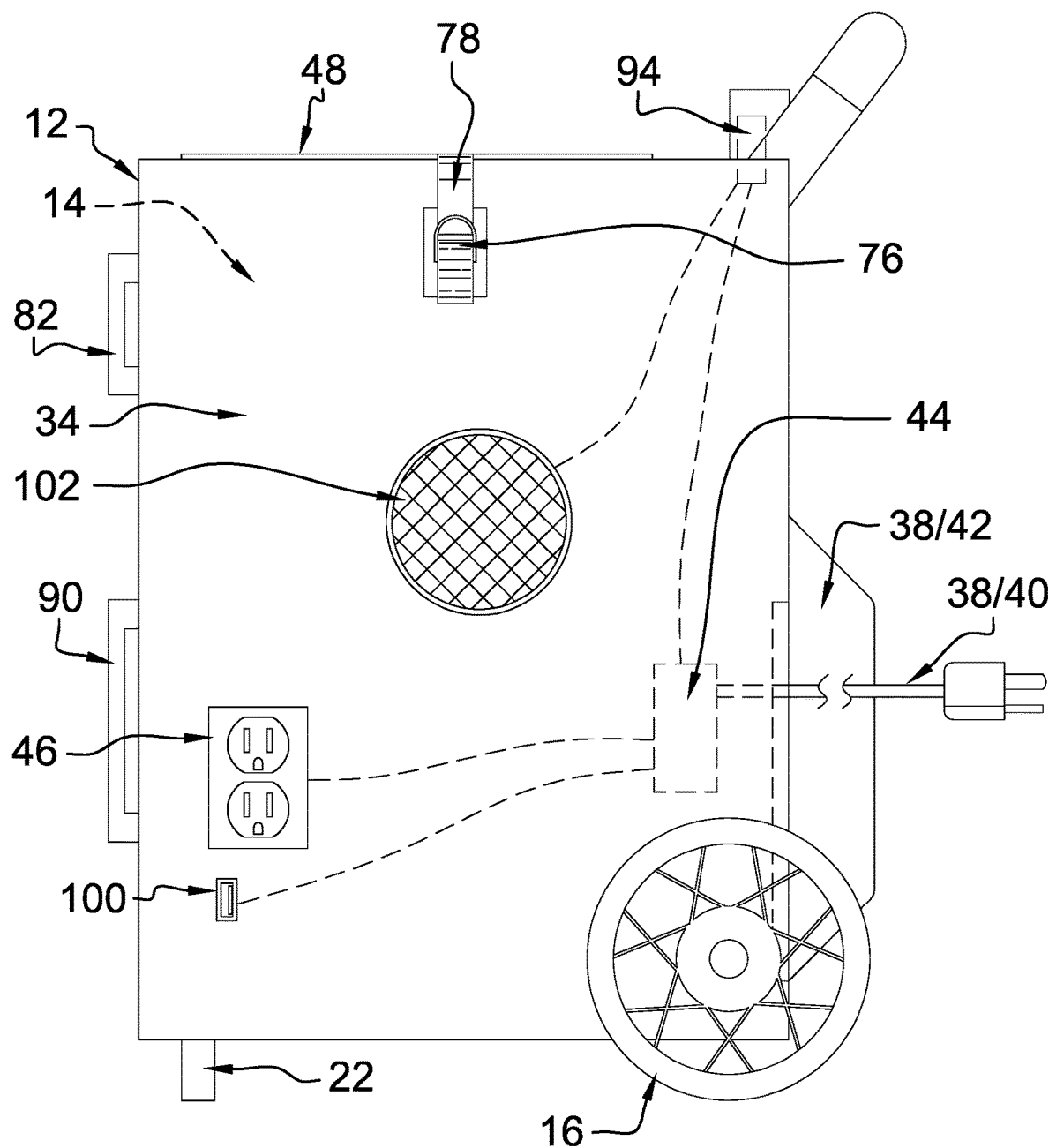
FIG. 5 is a side view of an embodiment of the disclosure.

A set of control elements 68 is engaged to the housing 12 and is operationally engaged to the first connectors 64. Each control element 68 is operationally engaged to a respective heating unit 52 of a respective cooktop 48 upon engagement of the respective cooktop 48 to the power module 38. The control element 68 is positioned to regulate a heat output level of the respective heating unit 52. Each control element 68 may comprise a knob 70, which is rotatably engaged to the housing 12, as shown in FIG. 2. The control element 68 also may comprise other control means, such as, but not limited to, slide switches, touch panel controls, and the like.

A pair of first fasteners 72 is engaged singly to the opposed sides 34 of the housing 12 proximate to the upper facet 50. A plurality of second fasteners 74 is engaged to the plurality of cooktops 48 so that two second fasteners 74 are engaged to each cooktop 48. The second fasteners 74 are complementary to the first fasteners 72. The second fasteners 74 positioned on a respective cooktop 48 are positioned to selectively engage the first fasteners 72 to engage the respective cooktop 48 to the housing 12. Each first fastener 72 and a respective second fastener 74 may comprise a latch 76, or other fastening means, such as, but not limited to, magnets, snap closures, and the like. As shown in FIG. 6, a plurality of straps 78 is engaged to and extends from the plurality of cooktops 48. Each second fastener 74 is engaged to a respective strap 78 distal from an associated cooktop 48. The respective strap 78 allows the second fastener 74 to reach the first fastener 72 to which it is to be engaged.

An oven 80 is engaged to the housing 12, is operationally engaged to the power module 38, and is positioned in the interior space 14 so that a door 82 of the oven 80 is accessible from a front 84 of the housing 12. The oven 80 is configured to bake or to cook a food item. The oven 80 may comprise a microwave 86, as shown in FIG. 2, a convection oven, a smoker, or the like.

A cooling unit 88 is engaged to the housing 12, is operationally engaged to the power module 38, and is positioned in the interior space 14 so that a door 90 of the cooling unit 88 is accessible from the front 84 of the housing 12. The cooling unit 88 is configured for cold storage of a food item. The cooling unit 88 comprises a refrigerator 92, as shown in FIG. 2, a fridge-freezer, or the like. The cooling unit 88 is positioned below the oven 80 so as to minimize heat transfer from the oven 80 to the cooling unit 88.

A microprocessor 94 is engaged to the housing 12 and is operationally engaged to the power module 38 and the cooktop 48. A display 96 is engaged to the housing 12 and is operationally engaged to the microprocessor 94. The microprocessor 94 is positioned to selectively actuate the display 96 to present one or more of a temperature setting, a temperature reading, a current time, an elapsed time, a measurement of a charge of the battery 42, and a charging state of the battery 42.

A receiver 98 is engaged to the housing 12, positioned in the interior space 14, and is operationally engaged to the microprocessor 94. The receiver 98 is configured to receive an audio signal from an electronic device, such as a cellphone, a laptop computer, and the like. A port 100 is engaged to the housing 12 and is operationally engaged to the microprocessor 94. The port 100 is configured for insertion of a communication plug of an audio device to operationally engage the audio device to the microprocessor 94. A speaker 102 is engaged to the housing 12 and is operationally engaged to the microprocessor 94. The speaker 102 is configured to broadcast the audio signal and can be used to provide audio entertainment while using the portable kitchen assembly 10 to prepare a meal.

In use, the portable kitchen assembly 10 can be rolled to a desired location using the handle 26 to tilt the housing 12 so that it is balanced upon the wheels 16. The housing 12 can easily be relocated from inside of a building to a porch, balcony, patio, and the like. The portable kitchen assembly 10 also is transportable in a vehicle and can be utilized at camping sites, tailgate parties, and the like. The present invention also anticipates larger versions of the portable kitchen assembly 10 that would be useful in smaller dwelling units, such as efficiency apartments, studio apartments, and the like.

The cooktop 48, oven 80, and cooling unit 88 can be powered by plugging the power cord 40 into a receptacle, or by the battery 42 if power is not available. A cooktop 48 from the plurality of cooktops 48 having an interface 54 appropriate for the cooking task at hand is selected and attached to the housing 12. Food items for a meal, stored in the cooling unit 88, then can be heated on the cooktop 48 or baked in the oven 80, as needed. The user also can enjoy audio entertainment from the speaker 102 while preparing the meal and can power electronic devices, such as a fan, using the outlet 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A portable kitchen assembly comprising:
a housing defining an interior space;
a power module engaged to the housing;
a cooktop engaged to an upper facet of the housing and being operationally engaged to the power module, wherein the cooktop is configured for heating a food item;
an oven engaged to the housing, operationally engaged to the power module, and positioned in the interior space, such that a door of the oven is accessible from a front of the housing, wherein the oven is configured for baking or cooking a food item;
a cooling unit engaged to the housing, operationally engaged to the power module, and positioned in the interior space, such that a door of the cooling unit is accessible from the front of the housing, wherein the cooling unit is configured for cold storage of a food item; and
a set of wheels engaged to a lower facet of the housing, wherein the wheels are configured for locomotion of the housing across a surface,
wherein the cooktop is one of a plurality of cooktops, each cooktop being selectively engageable to the housing, such that the cooktop is operationally engaged to the power module;
a recess extending into the upper facet of the housing, such that the recess is positioned for at least partial insertion of a respective cooktop of the plurality of cooktops;
a pair of first fasteners engaged singly to opposed sides of the housing proximate to the upper facet, each first fastener extending laterally outward from the housing spaced below the upper facet of the housing;
a plurality of second fasteners engaged to the plurality of cooktops, such that two second fasteners are engaged to each cooktop, the second fasteners being complementary to the first fasteners, such that the second fasteners positioned on a respective cooktop are positioned for selectively engaging the first fasteners for engaging the respective cooktop to the housing;
wherein each first fastener and a respective second fastener comprise a latch; and
a plurality of straps engaged to and extending from the plurality of cooktops, each second fastener being engaged to a respective strap distal from an associated cooktop wherein each strap extends away from the recess, over an outer edge of the upper facet, and down a lateral side of the housing to secure second fastener to the first fastener.

2. The portable kitchen assembly of claim 1, further including:
the set of wheels comprising two wheels positioned singly proximate to rear bottom corners of the housing; and
a bar engaged to and extending from the lower facet, the bar extending from proximate to front bottom corners of the housing, wherein the bar is configured for abutting the surface for positioning the lower facet substantially parallel to the surface.

3. The portable kitchen assembly of claim 1, further including a handle engaged to and extending from the housing, wherein the handle is configured for grasping in a hand of a user, positioning the user for locomoting the housing.

4. The portable kitchen assembly of claim 3, wherein the handle comprises a pair of side pieces and a center piece, each side piece being engaged to and extending from a respective upper back corner of the housing proximate to a respective opposed side of the housing, the center piece being engaged to and extending between the side pieces.

5. The portable kitchen assembly of claim 4, wherein each side piece comprises a plurality of nested sections such that the side piece is selectively extensible.

6. The portable kitchen assembly of claim 1, further including:
the power module comprising a power cord and a battery, the battery being rechargeable;
a power converter engaged to the housing, positioned in the interior space, and being operationally engaged to the battery and the power cord, wherein the power converter is configured for converting alternating current from the power cord to direct current for charging the battery, and for converting direct current from the battery to alternating current; and
an outlet engaged to the housing and being operationally engaged to the power module, wherein the outlet is configured for insertion of a power plug of an electrical device for operationally engaging the electrical device to the power module.

7. The portable kitchen assembly of claim 6, wherein the battery is selectively couplable to the housing, such that the battery is selectively detachable from the housing for charging.

8. The portable kitchen assembly of claim 1, wherein:
the cooktop is one of a plurality of cooktops, each cooktop being selectively engageable to the housing, such that the cooktop is operationally engaged to the power module;
each of the cooktops comprises a set of heating units and an interface, the set of heating units being operationally engaged to the interface; and
the plurality of cooktops comprises cooktops wherein the interface is configured as:
  a set of burners, wherein each of the burners is configured for positioning of a respective article of cooking hardware,
  a well, wherein the well is configured for positioning of an oil, positioning the set of heating units for heating the oil for frying a food item positioned in the oil, and
  a grill, wherein the grill is configured for grilling a food item.

9. The portable kitchen assembly of claim 8, wherein the set of burners comprises two burners.

10. The portable kitchen assembly of claim 8, further including:
a pair of first connectors engaged to the housing and being positioned in the recess, the first connectors being operationally engaged to the power module; and
a plurality of second connectors engaged to the plurality of cooktops, such that two second connectors are engaged to each cooktop, the second connectors being complementary to the first connectors, such that the second connectors engaged to a respective cooktop are positioned for selectively engaging the first connectors for operationally engaging the respective cooktop to the power module.

11. The portable kitchen assembly of claim 10, further including a set of control elements engaged to the housing and being operationally engaged to the first connectors, such that each control element is operationally engaged to a respective heating unit of a respective cooktop upon engagement of the respective cooktop to the power module, positioning the control element for regulating a heat output level of the respective heating unit.

12. The portable kitchen assembly of claim 11, wherein each control element comprises a knob rotatably engaged to the housing.

13. The portable kitchen assembly of claim 1, wherein:
the oven comprises a microwave, a convection oven, or a smoker;
the cooling unit comprises a refrigerator; and
the cooling unit is positioned below the oven.

14. The portable kitchen assembly of claim 1, further including:
a microprocessor engaged to the housing and being operationally engaged to the power module and the cooktop; and
a display engaged to the housing and being operationally engaged to the microprocessor, wherein the microprocessor is positioned for selectively actuating the display for presenting one or more of a temperature setting, a temperature reading, a current time, an elapsed time, a measurement of a charge of the battery, and a charging state of the battery.

15. The portable kitchen assembly of claim 1, further including:
a microprocessor engaged to the housing and being operationally engaged to the power module;
a receiver engaged to the housing, positioned in the interior space, and being operationally engaged to the microprocessor, wherein the receiver is configured for receiving an audio signal from an electronic device; and
a speaker engaged to the housing and being operationally engaged to the microprocessor, wherein the speaker is configured for broadcasting the audio signal.

16. The portable kitchen assembly of claim 15, further including a port engaged to the housing and being operationally engaged to the microprocessor, wherein the port is configured for insertion of a communication plug of an audio device for operationally engaging the audio device to the microprocessor.

17. A portable kitchen assembly comprising:
a housing defining an interior space;
a set of wheels engaged to a lower facet of the housing, wherein the wheels are configured for locomotion of the housing across a surface, the set of wheels comprising two wheels positioned singly proximate to rear bottom corners of the housing;
a bar engaged to and extending from the lower facet, the bar extending from proximate to front bottom corners of the housing, wherein the bar is configured for abutting the surface for positioning the lower facet substantially parallel to the surface;
a handle engaged to and extending from the housing, wherein the handle is configured for grasping in a hand of a user, positioning the user for locomoting the housing, the handle comprising a pair of side pieces and a center piece, each side piece being engaged to and extending from a respective upper back corner of the housing proximate to a respective opposed side of the housing, the center piece being engaged to and extending between the side pieces, each side piece comprising a plurality of nested sections such that the side piece is selectively extensible;
a power module engaged to the housing, the power module comprising a power cord and a battery, the battery being rechargeable, the battery being selectively couplable to the housing, such that the battery is selectively detachable from the housing for charging;
a power converter engaged to the housing, positioned in the interior space, and being operationally engaged to the battery and the power cord, wherein the power converter is configured for converting alternating current from the power cord to direct current for charging the battery, and for converting direct current from the battery to alternating current;
a cooktop engaged to an upper facet of the housing and being operationally engaged to the power module, wherein the cooktop is configured for heating a food item, the cooktop being one of a plurality of cooktops, each cooktop being selectively engageable to the housing, such that the cooktop is operationally engaged to the power module, each of the cooktops comprising a set of heating units and an interface, the set of heating units being operationally engaged to the interface, the plurality of cooktops comprising cooktops wherein the interface is configured as:
  a set of burners, wherein each of the burners is configured for positioning of a respective article of cooking hardware, the set of burners comprising two burners, a well, wherein the well is configured for positioning of an oil, positioning the set of heating units for heating the oil for frying a food item positioned in the oil, and a grill, wherein the grill is configured for grilling a food item;

a recess extending into the upper facet of the housing, such that the recess is positioned for at least partial insertion of a respective cooktop of the plurality of cooktops;

a pair of first connectors engaged to the housing and being positioned in the recess, the first connectors being operationally engaged to the power module;

a plurality of second connectors engaged to the plurality of cooktops, such that two second connectors are engaged to each cooktop, the second connectors being complementary to the first connectors, such that the second connectors engaged to a respective cooktop are positioned for selectively engaging the first connectors for operationally engaging the respective cooktop to the power module;

a set of control elements engaged to the housing and being operationally engaged to the first connectors, such that each control element is operationally engaged to a respective heating unit of a respective cooktop upon engagement of the respective cooktop to the power module, positioning the control element for regulating a heat output level of the respective heating unit, each control element comprising a knob rotatably engaged to the housing;

a pair of first fasteners engaged singly to the opposed sides of the housing proximate to the upper facet, each first fastener extending laterally outward from the housing spaced below the upper facet of the housing;

a plurality of second fasteners engaged to the plurality of cooktops, such that two second fasteners are engaged to each cooktop, the second fasteners being complementary to the first fasteners, such that the second fasteners positioned on a respective cooktop are positioned for selectively engaging the first fasteners for engaging the respective cooktop to the housing, each first fastener and a respective second fastener comprising a latch;

a plurality of straps engaged to and extending from the plurality of cooktops, each second fastener being engaged to a respective strap distal from an associated cooktop wherein each strap extends away from the recess, over an outer edge of the upper facet, and down a lateral side of the housing to secure second fastener to the first fastener;

an oven engaged to the housing, operationally engaged to the power module, and positioned in the interior space, such that a door of the oven is accessible from a front of the housing, wherein the oven is configured for baking or cooking a food item, the oven comprising a microwave, a convection oven, or a smoker;

a cooling unit engaged to the housing, operationally engaged to the power module, and positioned in the interior space, such that a door of the cooling unit is accessible from the front of the housing, wherein the cooling unit is configured for cold storage of a food item, the cooling unit comprising a refrigerator, the cooling unit being positioned below the oven;

a microprocessor engaged to the housing and being operationally engaged to the power module and the cooktop;

a display engaged to the housing and being operationally engaged to the microprocessor, wherein the microprocessor is positioned for selectively actuating the display for presenting one or more of a temperature setting, a temperature reading, a current time, an elapsed time, a measurement of a charge of the battery, and a charging state of the battery;

a receiver engaged to the housing, positioned in the interior space, and being operationally engaged to the microprocessor, wherein the receiver is configured for receiving an audio signal from an electronic device;

a speaker engaged to the housing and being operationally engaged to the microprocessor, wherein the speaker is configured for broadcasting the audio signal;

a port engaged to the housing and being operationally engaged to the microprocessor, wherein the port is configured for insertion of a communication plug of an audio device for operationally engaging the audio device to the microprocessor; and an outlet engaged to the housing and being operationally engaged to the power module, wherein the outlet is configured for insertion of a power plug of an electrical device for operationally engaging the electrical device to the power module.

\* \* \* \* \*